US006883630B2

(12) United States Patent
Morin

(10) Patent No.: US 6,883,630 B2
(45) Date of Patent: Apr. 26, 2005

(54) INBOARD BRAKE SYSTEM FOR A STRADDLE-TYPE ALL-TERRAIN VEHICLE

(75) Inventor: Vincent Morin, Canton de Brompton (CA)

(73) Assignee: Bombardier Recreational Products Inc., Valcourt (CA)

( * ) Notice: Subject to any disclaimer, the term of this patent is extended or adjusted under 35 U.S.C. 154(b) by 196 days.

(21) Appl. No.: 09/995,666

(22) Filed: Nov. 29, 2001

(65) Prior Publication Data

US 2002/0063010 A1 May 30, 2002

Related U.S. Application Data

(60) Provisional application No. 60/253,719, filed on Nov. 29, 2000.

(51) Int. Cl.[7] ............................................. B60K 17/34
(52) U.S. Cl. ........................ 180/244; 180/908; 180/370; 192/218; 192/221; 475/900; 188/58
(58) Field of Search ....................... 188/58, 71.1, 72.1; 180/908, 370, 244, 233; 192/218, 221; 475/900

(56) References Cited

U.S. PATENT DOCUMENTS

| 1,512,401 | A | * | 10/1924 | Burrows .................... 475/225 |
|---|---|---|---|---|
| 2,936,035 | A | | 5/1960 | Hill |
| 3,439,786 | A | * | 4/1969 | Schmid ........................ 475/84 |
| 3,780,834 | A | * | 12/1973 | Lottridge et al. ......... 188/18 A |
| 3,896,895 | A | * | 7/1975 | Schultz et al. .............. 180/370 |
| 4,081,049 | A | * | 3/1978 | Youmans .................... 180/255 |
| 4,561,518 | A | * | 12/1985 | Grinde ........................ 180/215 |
| 4,664,208 | A | * | 5/1987 | Horiuchi et al. .............. 180/23 |
| 4,667,760 | A | | 5/1987 | Takimoto |
| 4,719,984 | A | | 1/1988 | Watanabe |
| 4,848,521 | A | * | 7/1989 | Izumine .................... 188/18 A |
| 5,515,940 | A | * | 5/1996 | Shichinohe et al. ......... 180/376 |
| 6,354,421 | B1 | * | 3/2002 | Mochizuki et al. ......... 192/218 |
| 6,491,126 | B1 | * | 12/2002 | Robison et al. ............. 180/233 |

OTHER PUBLICATIONS www.yamaha.com; copyright 1996–2002 Yamaha Motor Corporation, U.S.A.

* cited by examiner

Primary Examiner—Ruth Ilan
(74) Attorney, Agent, or Firm—BRP Legal Services

(57) ABSTRACT

A brake system is provided for a straddle-type ATV. The brake system includes a brake caliper configured to mount to a gear box of the ATV and a brake disk configured to connect to a coupling member of the gear box coupled to a shaft and positioned in operative relation relative to the caliper. The brake system additionally includes a brake-actuating control mechanism in communication with the brake caliper. The brake-actuating control mechanism controls the brake caliper to provide selective frictional engagement between the brake caliper and the brake disk.

15 Claims, 9 Drawing Sheets

INBOARD BRAKE SYSTEM FOR A STRADDLE-TYPE ALL-TERRAIN VEHICLE

CROSS-REFERENCE TO RELATED APPLICATIONS

This application claims priority to U.S. Provisional Application Ser. No. 60/253,719, filed Nov. 29, 2000.

BACKGROUND OF THE INVENTION

1. Field of the Invention

The present invention relates to a brake system for a vehicle and, more particularly, to an inboard brake system for a straddle-type all-terrain vehicle.

2. Description of Related Art

All-terrain vehicles (ATV's) generally utilize front and rear brake systems. Prior front brake systems have included disk or drum brake assemblies that are mounted to each front wheel assembly. For example, it is known in the art to mount a brake disk to the hub of each front wheel assembly that is engagable by a brake caliper. Each brake caliper is rigidly mounted to the upright structure of each wheel assembly, and is driven by a hydraulic or cable system that is actuated using a hydraulic or mechanical lever mounted on the handlebars. Additionally, it is known to mount a brake drum to the hub and provide a pair of brake shoes engagable with the brake drum to effect braking. The brake shoes and an actuating mechanism (typically includes a piston and adjuster) are mounted to the upright structure of the wheel assembly within an inner periphery of the brake drum and are non-rotatable relative to the brake drum. Similarly as with disk brakes, drum brakes may be driven by a hydraulic or cable system actuated using a hydraulic or mechanical lever mounted on the handlebars.

These types of front braking systems provide adequate braking force, but have several disadvantages. For example, mounting the brake assemblies to the front wheel assemblies exposes the components of the brake assemblies, such as the brake disks or drums, calipers, and brake lines, to damage from obstacles such as rocks and other debris. Furthermore, the weight that is carried by the suspension is increased since the entirety of each brake assembly is mounted on the respective wheel assembly. As such, there is more weight on moving parts of the suspension system requiring these parts to be stronger. Strengthening the suspension system generally requires heavier and/or more expensive parts. Furthermore, it may be more difficult to precisely tune or calibrate the suspension system, especially shocks and/or springs, to provide a comfortable ride.

Prior rear brake systems include those that have been used on ATVs that have chain driven rear axles. These brake systems generally have a single brake disk mounted on the rear axle. These types of brake systems however usually lead to chain stretching, which may cause damaging backlash due to slack in the chain. Upon braking, take-up of slack in the chain causes jarring of the ATV. The jarring can cause fatigue wear of the rear axle components.

An alternative to this type of rear brake system includes rear disk brake assemblies that are mounted to at least one of the rear wheel assemblies. These systems are applicable to ATVs that have chain-driven or shaft-driven rear axles. However, as with the similar front disk brake systems, these rear disk brake systems are prone to damage from debris and increase the sprung weight of the rear suspension. Furthermore, four wheel drive-type all-terrain vehicles that have these types of brake systems are also subject to damaging backlash within the rear drive assembly, which typically includes a gear box. Backlash is caused when braking power is transferred from, e.g., the rear brakes to the front of the vehicle through the rear drive assembly and drive line. The braking power that is transferred through the rear drive assembly is subject to play between gears within the gear box. When the brakes are engaged, the output of the rear drive assembly effectively slows or stops and the rear drive assembly is jarred as the engine takes up the play within the gearing of the gear box. The jarring can cause excessive wear and fatiguing of the gears and result in damage to the rear drive assembly.

Another type of rear brake system for an all-terrain vehicle is described in U.S. Pat. No. 5,775,457 that includes a drum brake assembly that is integral with the rear gear box. The drum brake assembly is mounted adjacent the gearing of the gear box and internally of the gear box housing. This type of brake system may decrease backlash somewhat, however is costly to manufacture.

Further, a rear disk brake system has been used that utilizes a single disk brake assembly that is mounted to the engine/transmission end of the drive shaft connecting the rear drive assembly to the transmission. In this system, the brake disk is mounted to a hub disk that is rotatable with the drive shaft. The caliper is mounted to either the engine or the transmission to be engagable with the brake disk. This system is disadvantageous in that the brake system is exposed to the high heat conditions of the engine and transmission. Prolonged exposure to high heat conditions is detrimental to brake pad and brake disk life and reduces braking effectiveness and efficiency.

BRIEF SUMMARY OF PREFERRED EMBODIMENTS

It is an aspect of the invention to provide a brake system for an ATV that is less prone to damage from obstacles than prior art systems.

It is another aspect of the invention to provide a brake system for an ATV that reduces weight carried by the suspension relative to prior art systems.

It is another aspect of the invention to provide a brake system for an ATV that has reduced componentry.

It is yet another aspect of the invention to provide a brake system for an ATV that reduces backlash within a drive assembly of the ATV.

According to one preferred embodiment of the present invention, a brake system for a straddle-type ATV is provided that includes a brake caliper configured to mount to a gear box of the ATV and a brake disk configured to connect to a coupling member of the gear box coupled to a shaft and positioned in operative relation relative to the caliper. The brake system also includes a brake-actuating control mechanism in communication with the brake caliper, wherein the brake-actuating control mechanism controls the brake caliper to provide selective frictional engagement between the brake caliper and the brake disk.

It is an aspect of the invention to provide an ATV with a brake system that is less prone to damage from obstacles than prior art ATVs.

It is another aspect of the invention to provide an ATV with a brake system that reduces weight carried by the suspension relative to prior art ATVs.

It is another aspect of the invention to provide an ATV with a brake system that has reduced componentry.

It is yet another aspect of the invention to provide an ATV with a brake system that reduces backlash within a drive assembly of the ATV.

According to another preferred embodiment of the present invention, a straddle-type ATV is provided that includes a plurality of wheels, a frame, an engine coupled to the frame and constructed and arranged to provide power to at least one of the plurality of wheels, and a transmission coupled to the engine. The ATV also includes a gear box connected to the frame and in spaced relation to the engine and the transmission, wherein the gear box is operatively connected to the transmission via a driveshaft. The ATV also includes a pair of wheel assemblies that support the plurality of wheels, wherein the wheel assemblies are communicated to the gear box. Furthermore, the ATV includes a brake system that includes a brake caliper configured to mount to the gear box, a brake disk configured to connect to a coupling member of the gear box coupled to a shaft and positioned in operative relation relative to the caliper, and a brake-actuating control mechanism in communication with the brake caliper. The brake-actuating control mechanism controls the brake caliper to provide selective frictional engagement between the brake caliper and the brake disk.

Those and other aspects, features and advantages of the present invention will become apparent from the following detailed description of the accompanying drawings.

DETAILED DESCRIPTION OF PREFERRED EMBODIMENTS

Figure 1:
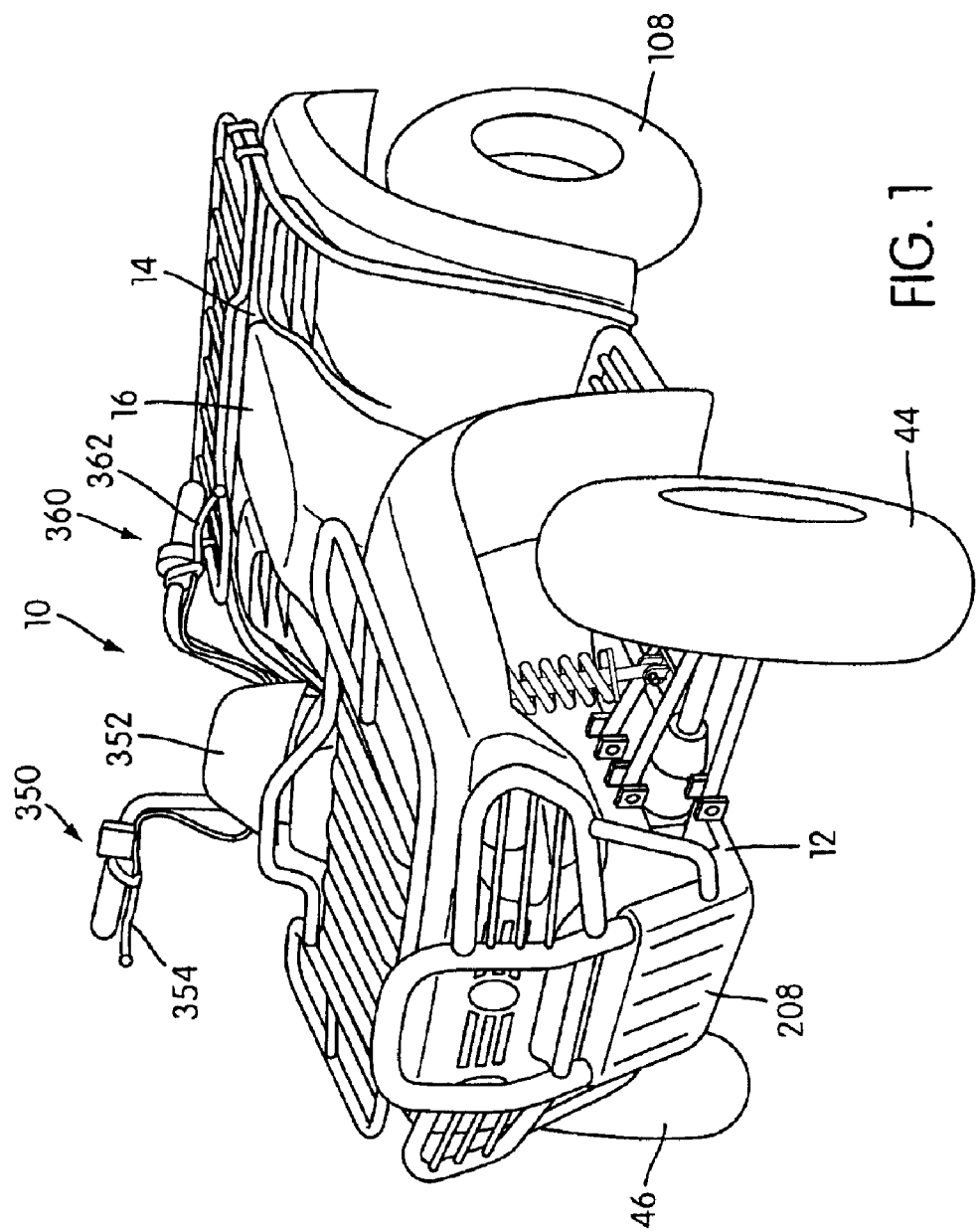
FIG. 1 is a perspective view of a straddle-type all-terrain vehicle (ATV) equipped with a brake system of the present invention.

FIG. 1 shows an all-terrain vehicle (ATV) 10 equipped with a brake system of the present invention. The ATV 10 comprises a frame structure 12, which extends substantially the entire length of the ATV 10. A body portion 14 is disposed above and connected to the frame structure 12 and preferably includes a straddle-type seat 16 thereon.

Figure 2:
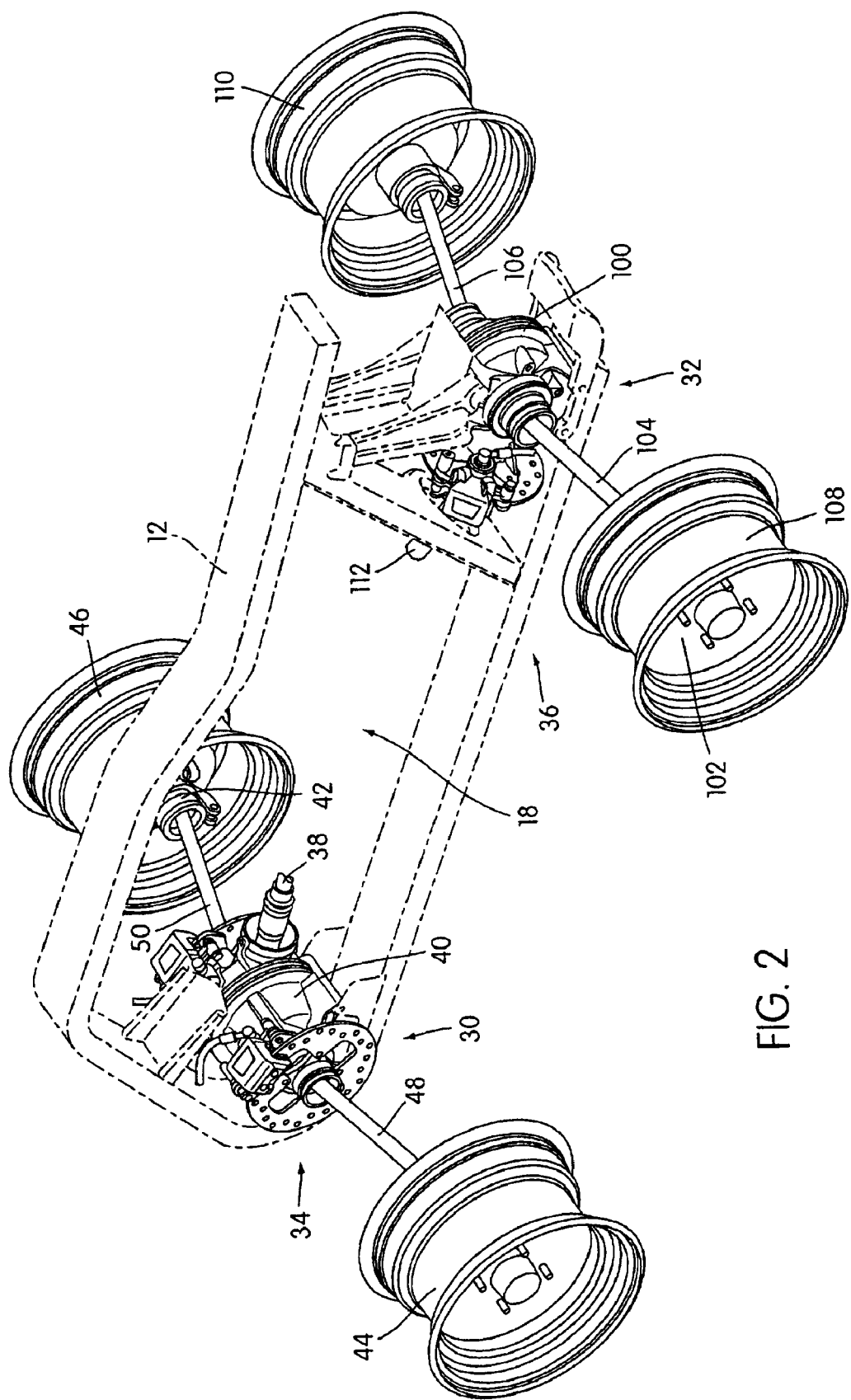
FIG. 2 is a perspective view of a frame in phantom including a brake system of the present invention.

As shown in FIG. 2, frame structure 12 defines an engine-receiving opening, indicated at 18, within which a power unit, e.g., an engine (not shown), may be positioned. Preferably, the engine includes an integral transmission or has a transmission operatively coupled thereto (not shown).

The ATV 10, shown in FIG. 1, is of a 4-wheel drive type. Two front and rear brake systems of the present invention are illustrated in FIG. 2 at 30 and 32, respectively. The brake system 30 is shown installed on a front drive assembly 34 of the ATV 10, while the brake system 32 is shown installed on a rear drive system 36. Of course, either embodiment 30, 32 of the brake system of the present invention may be used on either of the front and rear drive systems 34, 36, as will be described in further detail below.

As shown in FIG. 2, the front drive system 34 includes a drive shaft, or propeller shaft, 38, which is connected to and transfers power between the transmission and a gear box 40. It is noted that the gear box 40 may be a differential type gear box, which allows relative rotational movement between the wheel assemblies 44, 46. FIG. 2 shows the gear box 40 as a differential type gear box, however, it is, of course, possible for any other type of gear box to be used that is capable of transferring power between the drive shaft 38 and wheel assemblies 44, 46. The gear box 40 is operatively coupled to each hub 42 of front wheel assemblies 44, 46 via respective half-shafts 48, 50. The half-shafts 48, 50 serve to provide for the transfer of power between the differential 40 and the hubs 42. It is noted that each half-shaft 48, 50 may include one or more universal joints or ball-spline joints, which allow for the transfer of power and movement of the wheel assemblies 44, 46.

Figure 3:
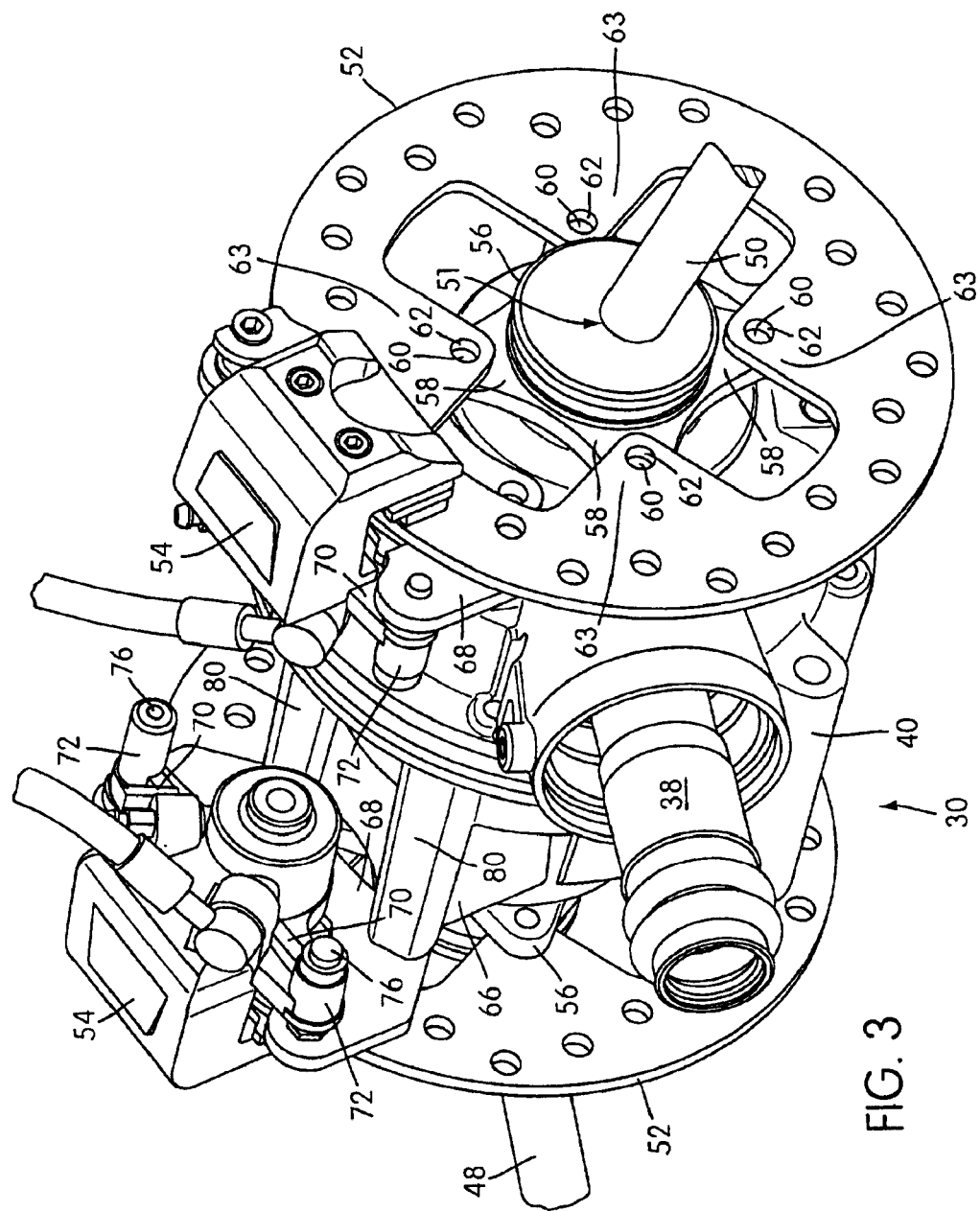
FIG. 3 is a detailed perspective view of a first embodiment of the brake system of the present invention.

As shown in FIG. 3, the brake system 30 includes a pair of brake disks 52 and a corresponding pair of brake calipers 54. It is noted that, for a non-differential type gear box, the brake system 30 may include a single brake disk 52 and corresponding brake caliper 54. However, preferably, when the gear box is a differential type, the brake system 30 includes a pair of brake disks 52 and a corresponding pair of calipers 54. The brake disks 52 and calipers 54 provide at least some of the braking capability of the ATV 10. As shown in FIGS. 3–6, each brake disk 52 is fixed to a coupling member 56, which is communicated with the gear box 40 so as to transfer power from the gear box 40 to the respective half-shaft 48, 50, as will be discussed below. Each coupling member 56 includes a plurality of radially outwardly extending flange elements 58. Each flange element 58 has a plurality of threaded openings 60 (as shown in FIG. 3), which correspond to a plurality of openings 62 within a plurality of radially inwardly extending connecting portions 63 of the respective brake disk 52. A plurality of fasteners 64 (see FIG. 6) extend within the openings 62 in the disk 52 and threadedly engage within the threaded openings 60 within the coupling member 56. It is noted that the fasteners 64 may be threaded fasteners or any other suitable fasteners. Additionally, each disk 52 may be mounted to the coupling member 56 in any other suitable manner, or may be formed integrally with the coupling member 56. Accordingly, the brake disk 52 may be non-rotatably mounted to respective differential hubs 56 (see FIG. 3). It is contemplated that the brake disk 52 may cooperate with the coupling member 56 and fasteners 64 so as to form a floating-type brake disk configuration. Such a floating type brake disk configuration allows for the expansion of the brake disk caused by heat build-up and may prevent warpage of the disk in high heat situations. It is, of course, also contemplated that the brake disk 52 may be substantially rigidly connected to respective coupling members 56, i.e. a non-floating disk configuration. In the case wherein the brake disk 52 is mounted in a floating manner, it may be preferable for the caliper 54 to be mounted in a relatively rigid fashion. Alternatively, in the case wherein the brake disk 52 is mounted in a relatively rigid manner, it may be preferably for the caliper 54 to be mounted in a floating fashion.

Figure 4:
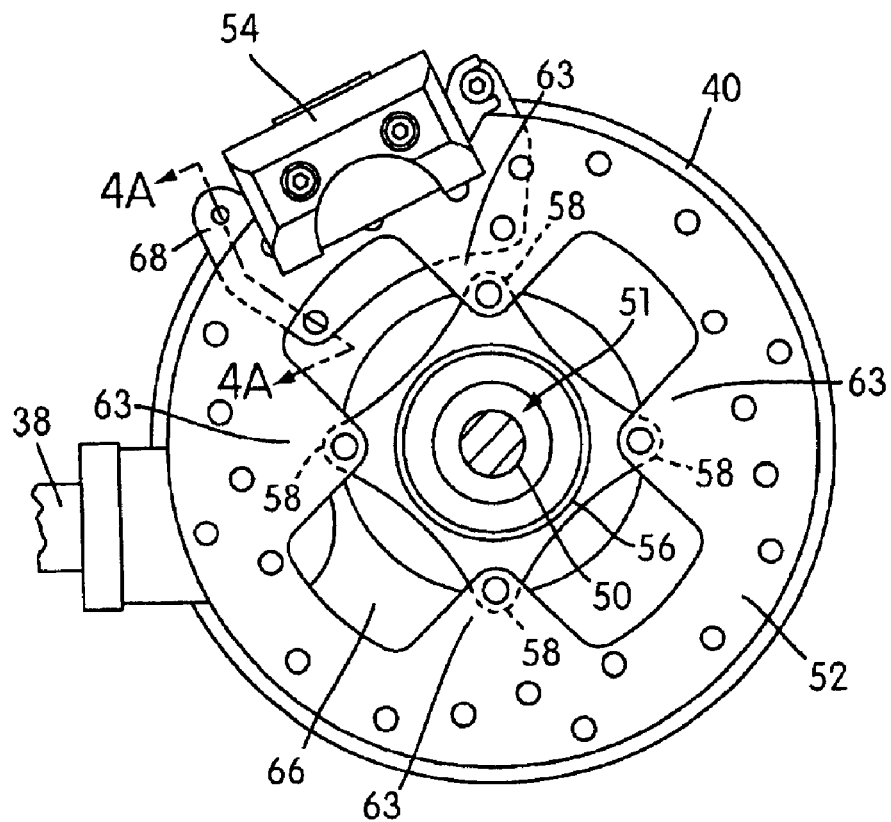
FIG. 4 is a side view of the brake system shown in FIG. 3.
Figure 4A:
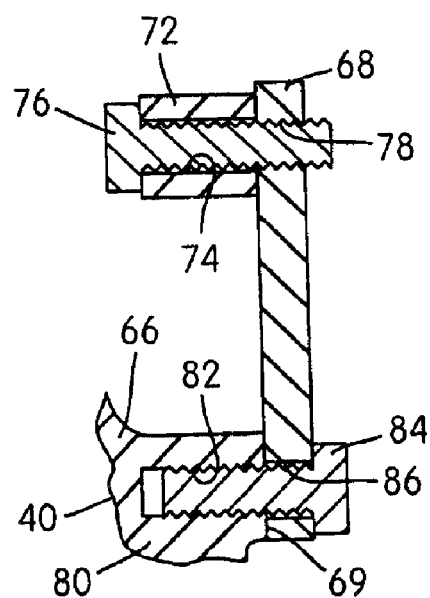
FIG. 4A is a sectional view of a portion of the brake system taken along line 4A—4A in FIG. 4.
Figure 5:
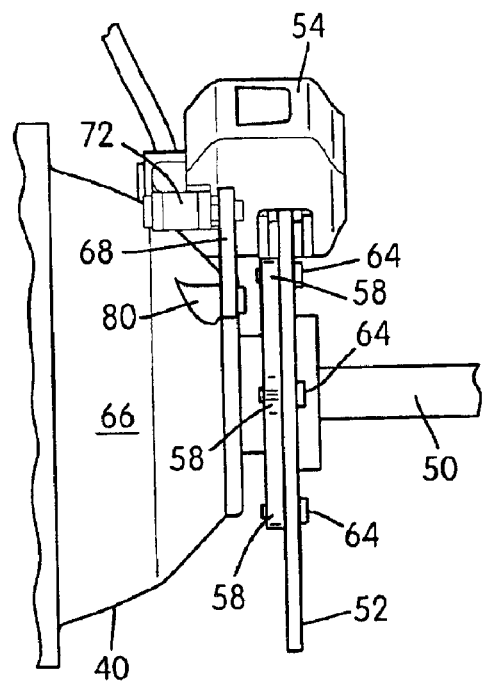
FIG. 5 is a front view of the first embodiment of the brake system shown in FIG. 3.

Each caliper 54 is coupled to a casing, or housing, 66 of the gear box 40. Brackets 68 are rigidly connected to respective laterally outwardly facing surfaces 69 of the casing 66 and extend generally radially outwardly from the casing 66. The bracket 68 may extend radially outwardly from the casing 66 to a point past a radial extent of the brake disk 52, however, bracket 68 may also be configured such that it does not extend radially past the radial extent of the brake disk 52. As shown in FIG. 3, each caliper 54 may include laterally outwardly extending leg structures 70 that are connected to the brackets 68. An outward end of each leg structure 70 includes a post portion 72 that has a fastener receiving opening 74 formed therein. Referring to FIG. 4A, a fastener 76 is disposed within each opening 74 and is threadedly engaged with a threaded opening 78 within the bracket 68. Accordingly, the calipers 54 are securely connected to respective brackets 68. As also shown in FIG. 4A, the casing 66 has formed therein a plurality of fastener receiving portions 80 which abut bracket 68 at the outwardly facing surfaces 69 thereof. Each fastener receiving portion 80 includes a threaded opening 82 that threadedly receives a threaded fastener 84, which extends through an opening 86 in the bracket 68. Accordingly, the calipers 54 may be connected to the casing 66 via the brackets 68.

The illustrated embodiment of the brake system 30 is shown installed on the front drive assembly 34, which is a gear box and half-shaft type drive assembly. It is noted, however, that the brake system 30 may be installed on either or both of the front drive assembly and rear drive assembly when these drive assemblies are gear box and half-shaft types. As such, the brake system 30 may be used as either a front braking system or a rear braking system. It is also noted that an ATV may be equipped with the brake system 30 on either it's front or rear drive assemblies or on both.

FIG. 3 shows the half-shafts 48, 50 and gear box 40 connected with ball-spline joints 51. In particular, each end of each half-shaft 48, 50 is provided with a series of splines (not shown) that are received within respective splined openings (not shown) within the hubs 42. In this manner, the half-shafts 48, 50 are able to transfer power between the gear box 40 and the hubs 42 to affect movement of the ATV. Additionally, the wheel assemblies 44, 46 are capable of moving relative to the frame 12 due to the ball-spline joints to allow for suspension travel. In this configuration, the coupling members 56 are axially and radially stationary with respect to the gear box 40 and therefore are axially and radially stationary with respect to the calipers 54.

Figure 7:
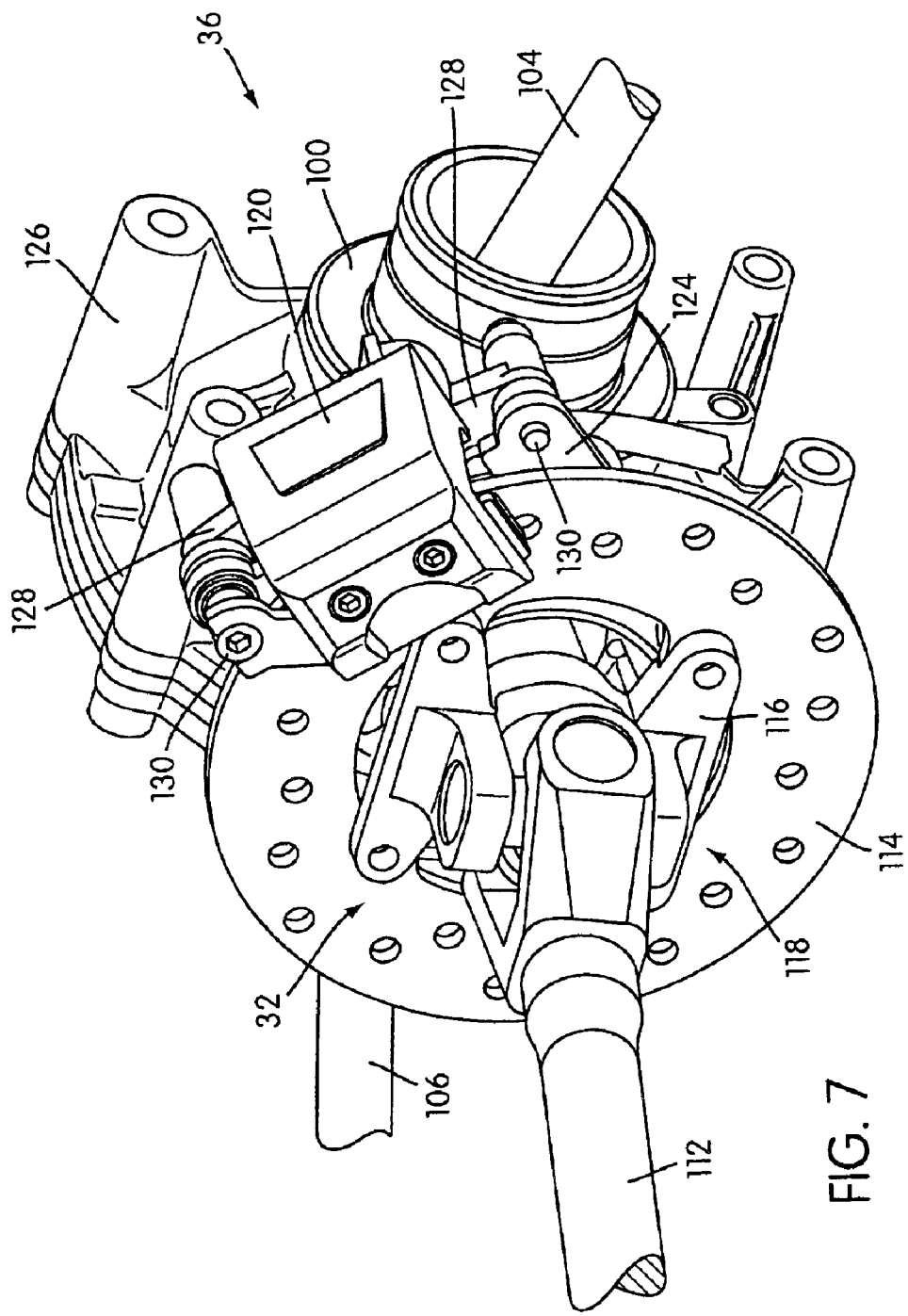
FIG. 7 is a detailed perspective view of a second embodiment of the present invention.

Conversely, it is contemplated that the half-shafts 48, 50 may be provided with universal joints to allow for the suspension travel in lieu of the ball-spline joints 51. For this situation, the coupling members 56 form yokes, which cooperate with corresponding yokes on ends of the half-shafts 48, 50. The brake disks 52 are connected to respective yokes, similarly as shown in FIG. 7 with respect to yoke 116 and brake disk 114. In this manner, power is transferred between the gear box 40 and the hubs 42 via the half-shafts 48, 50 and the universal joints, while allowing for suspension travel of the wheel assemblies 44, 46. In this configuration, the yokes are axially and radially stationary with respect to the gear box 40 and therefore are axially and radially stationary with respect to the calipers 54.

Figure 6:
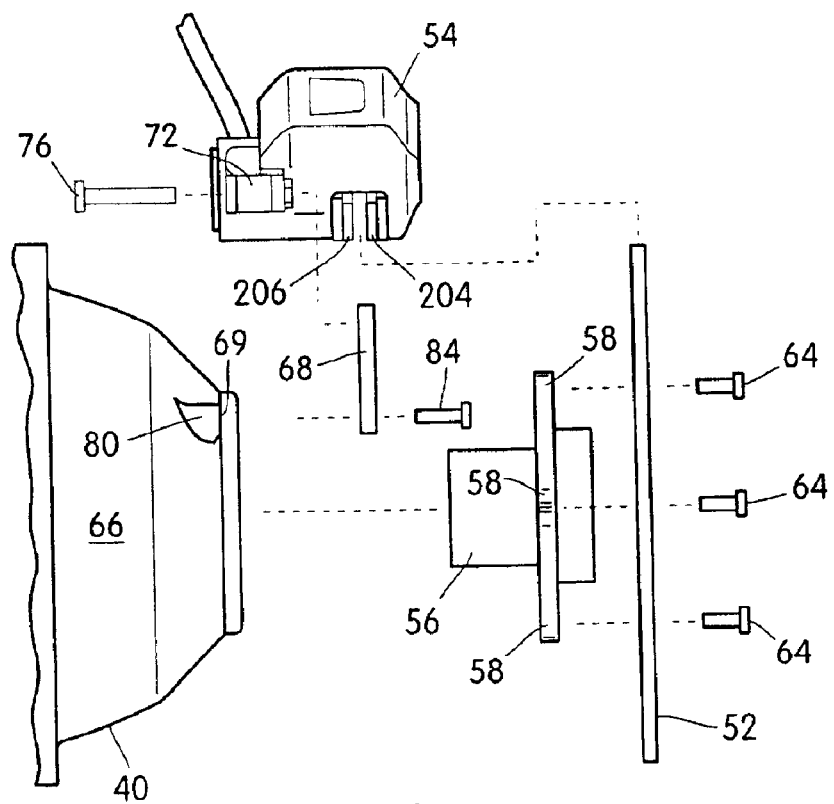
FIG. 6 is an exploded view of the brake system shown in FIG. 5.

As shown in FIG. 6, each of the calipers 54 includes an outer brake pad 204 and an inner brake pad 206. It is noted that the brake pads 204, 206 are preferably formed of a friction material to increase friction (and therefore the braking force) between the brake pads and the associated brake disks. Furthermore, it is preferable of the material of the brake pads to be relatively softer than the material of the brake disks to prevent excessive wear of the brake disks. Each of the outer brake pads 204 is engagable with an associated outwardly facing surface of the respective brake disk 52. Similarly, each inner brake pad 206 is engagable with an inwardly facing surface of the respective brake disk 52.

Each of the half-shafts 48, 50 is non-rotatably coupled to the associated hub 42, therefore is able to transfer a braking force generated by the brake system 30 to the associated hub 42 via the respective half-shafts 48, 50. As such, the ATV 10 may be slowed and/or stopped.

The brake system 30 is advantageous due to the inboard arrangement of the brake disks 52 and calipers 54. The components of the brake system (calipers, brake disks, hydraulic lines, etc.) are significantly more protected than prior art systems wherein the components are mounted adjacent the wheel assemblies. The brake system 30 is much less prone to suffer damage from rocks, sticks, and other debris. Furthermore, a skid plate, or protector plate 208 (see FIG. 1) may be fixedly connected to the frame 12 in underlying, or otherwise protecting relation to the brake system 30 to further prevent exposure to possibly damaging objects.

FIG. 1 shows a brake-actuating mechanism 350 mounted to a handle bar structure 352 of the ATV 10. It is noted that the illustrated embodiment 30 of the brake system of the present invention is shown as a hydraulically-actuated brake system. As such, the brake-actuating mechanism 350 may be hydraulically connected to the brake calipers 54 to thereby manipulate each of the brake calipers 54. Hydraulic lines (in the form of hosing, piping, etc.) extend between each of the brake calipers 54 and the brake-actuating mechanism 350. The hydraulic lines may be rigid tubing, since the brake calipers 54 and disks 52 are not mounted to (and therefore do not move with) the wheel assemblies 44, 46, as with previous brake systems and therefore the hydraulic lines are not prone to fatigue breakage. The brake-actuating mechanism 350 is constructed and arranged to be manipulable by the user. In the illustrated embodiment, the brake-actuating mechanism 350 includes a lever member 354 that is actuable by the user's hand. When squeezed, the brake-actuating mechanism 350 delivers a fluid under pressure to each of the brake calipers 54 via the hydraulic lines to thereby engage each of the brake pads with the respective sides of each brake disk. It is also contemplated that the brake system 30 may be cable or linkage-actuated. For example, a sheathed cable (not shown) may extend from the brake-actuating mechanism 350 to each of the brake calipers 54 to allow the user to actuate the calipers 54. In any case, the brake disks 52 may be effectively "squeezed" between the brake pads when the respective brake calipers 54 are actuated.

Referring back to FIG. 2, the second embodiment 32 of the brake system of the present invention is shown installed on the rear drive assembly 36 of the ATV 10. The rear drive assembly 36 includes a gear box, 100, which is communicated to rear hubs 102 to transfer power thereto via respective half-shafts 104, 106. In this manner, wheel assemblies 108, 110 have power provided thereto via the respective half-shafts 104, 106, the gear box 100, and a drive shaft, or propeller shaft, 112, which communicates and transfers power between the transmission and gear box 100. It is noted that the gear box 100 may be of any type including a differential type (which allows relative rotational movement between the wheel assemblies 108, 110). It is further noted that FIG. 2 shows the gear box 100 as a non-differential type, however, any other type of gear box may be used that is capable of transferring power between the drive shaft 112 and wheel assemblies 108, 110.

Shown in greater detail in FIG. 7, the brake system 32 includes a brake disk 114 connected to a yoke 116 of a universal joint 118 on a rearward end of the drive shaft 112. Additionally, the brake system 32 includes a brake caliper 120 relatively fixedly mounted to the gear box 100. In this manner, the brake system 32 is able to provide at least some of the braking capability of the ATV 10.

Figure 8:
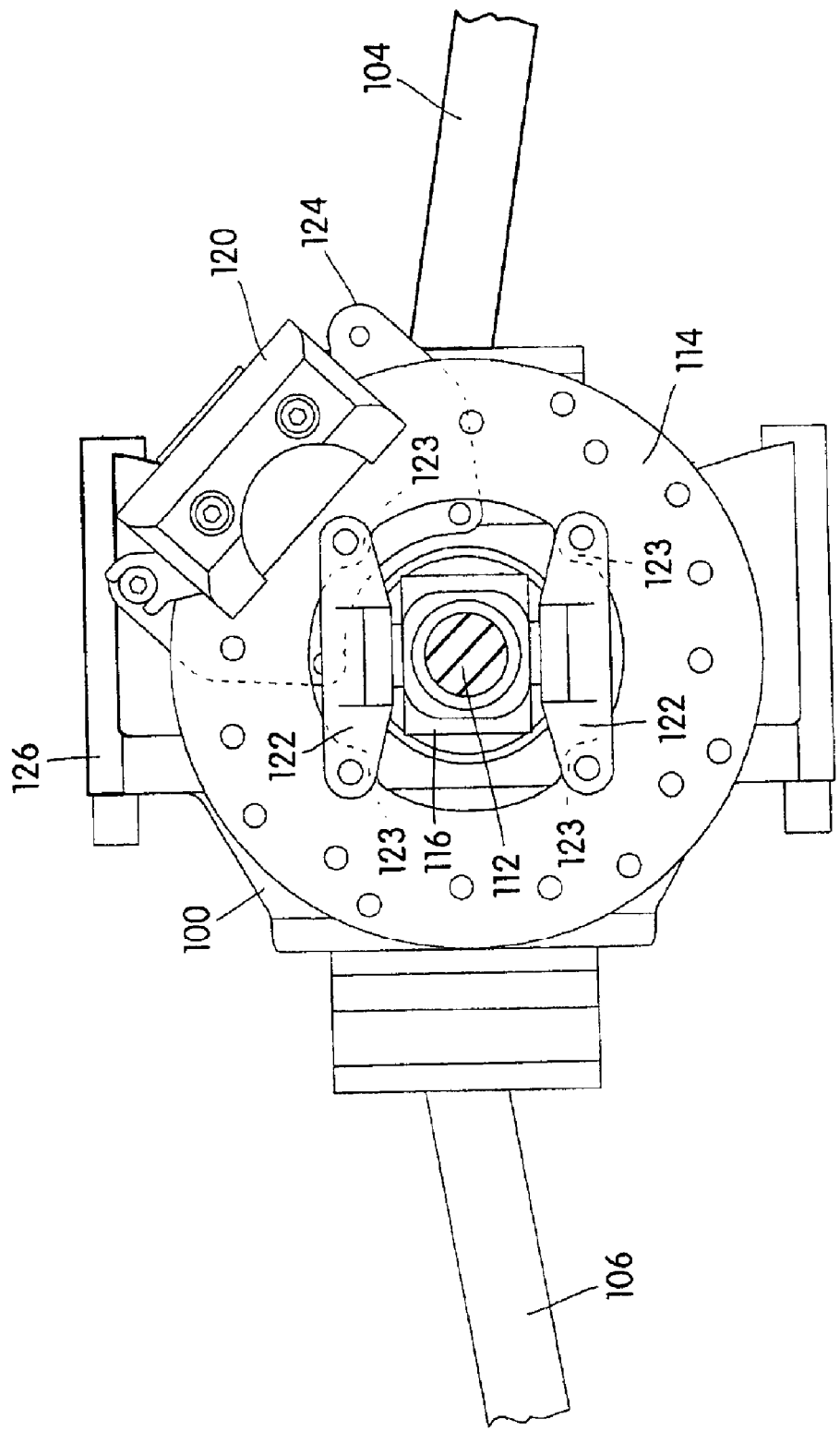
FIG. 8 is a front view of the brake system shown in FIG. 7.

As shown in FIG. 8, the yoke 116 includes a pair of flange structures 122 that allow for the connection of the brake disk 114 to the yoke 116. Specifically, the brake disk 114 includes a plurality of radially inwardly extending connecting portions 123 that cooperate with respective outer end portions of the flange structures 122. As also shown, the caliper 120 is connected to a bracket 124 that extends between and connects the caliper 120 and a casing, or housing, 126 of the gearbox 100.

Figure 9:
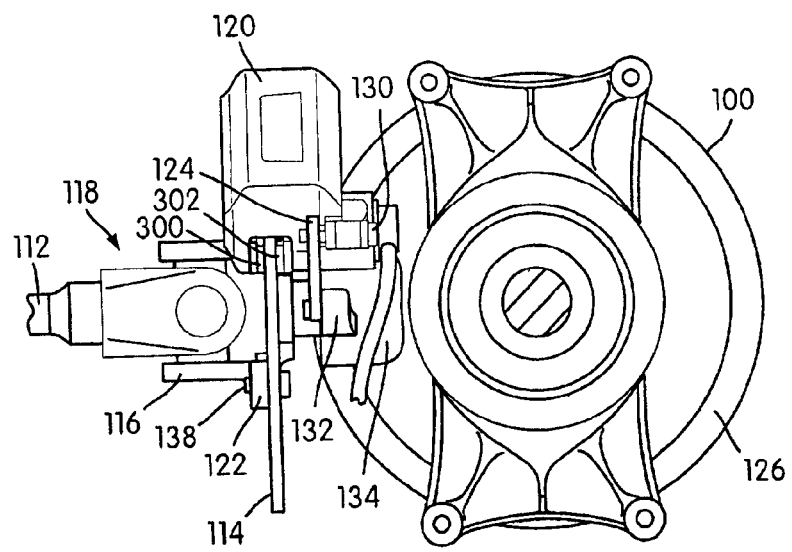
FIG. 9 is a side view of the brake system shown in FIG. 8.
Figure 10:
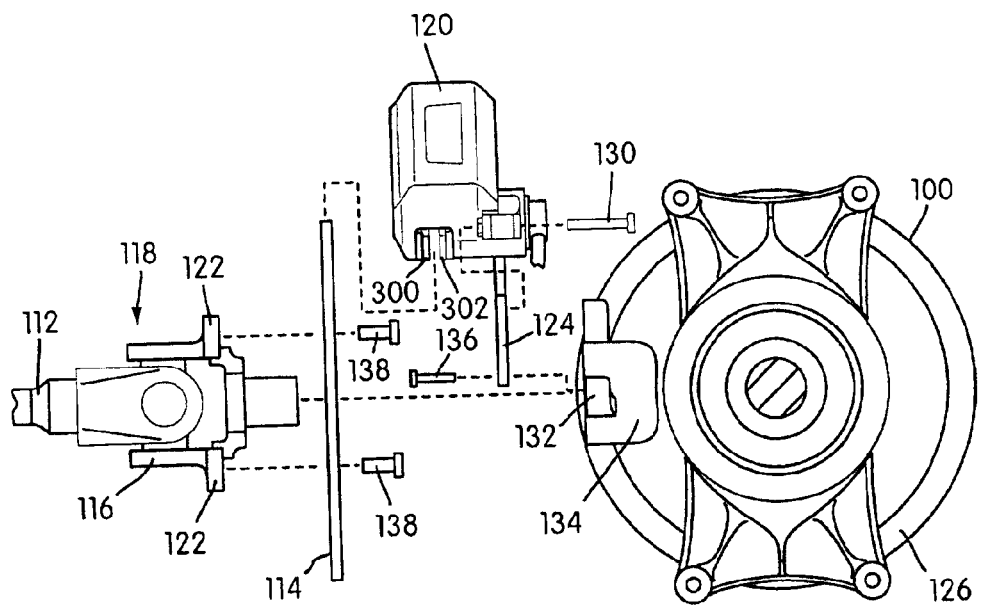
FIG. 10 is an exploded view of the brake system shown in FIG. 9.

Referring back to FIG. 7, the caliper 120 includes a pair of generally laterally outwardly extending leg structures 128, which serve to connect the caliper 120 to the bracket 124 via a pair of fasteners 130, as described with respect to the first embodiment 30 of the brake system of the present invention. Additionally, the bracket 124 is connected to fastener receiving portions 132 (see FIG. 9) provided by an input portion 134 of the gear box 100, as shown in FIGS. 9 and 10. Fasteners 136 connect the bracket 124 to the fastener receiving portions 132, similarly as with the first embodiment 30 of the brake system of the present invention. As shown in FIG. 10, the brake disk 114 is connected to the flange structures 122 via respective threaded fasteners 138.

It is noted that the brake disk 114 and caliper 120 may be of the floating type, as discussed above with respect to the first embodiment 30 of the brake system of the present invention, to allow for expansion of the brake disk 114 in high heat situations.

As shown in FIGS. 9 and 10, the caliper 120 includes an outer brake pad 300 and an inner brake pad 302. It is noted that the brake pads 300, 302 are preferably formed of a friction material to increase friction (and therefore the braking force) between the brake pads and the brake disk 114. Furthermore, it is preferable for the material of the brake pads to be relatively softer than the material of the brake disk to prevent excessive wear of the brake disk. Each of the outer brake pads 300 is engagable with an associated outwardly facing surface of the brake disk 114. Similarly, each inner brake pad 302 is engagable with an inwardly facing surface of the brake disk 114.

As shown in FIG. 2, each of the half-shafts 104, 106 is non-rotatably coupled to the associated hub 102, therefore is able to transfer a braking force generated by the brake system 32 to the associated hub 102 via the respective half-shafts 104, 106. As such, the ATV 10 may be slowed and/or stopped.

The embodiment 32 of the brake system illustrated in FIG. 2 is shown installed on a gear box and half-shaft type drive assembly. It is noted, however, that the brake system 32 may be used on either or both of a front and rear drive assembly. It is also noted that the brake system 32 is not limited to use with a gear box and half-shaft type drive assembly.

Figure 11:
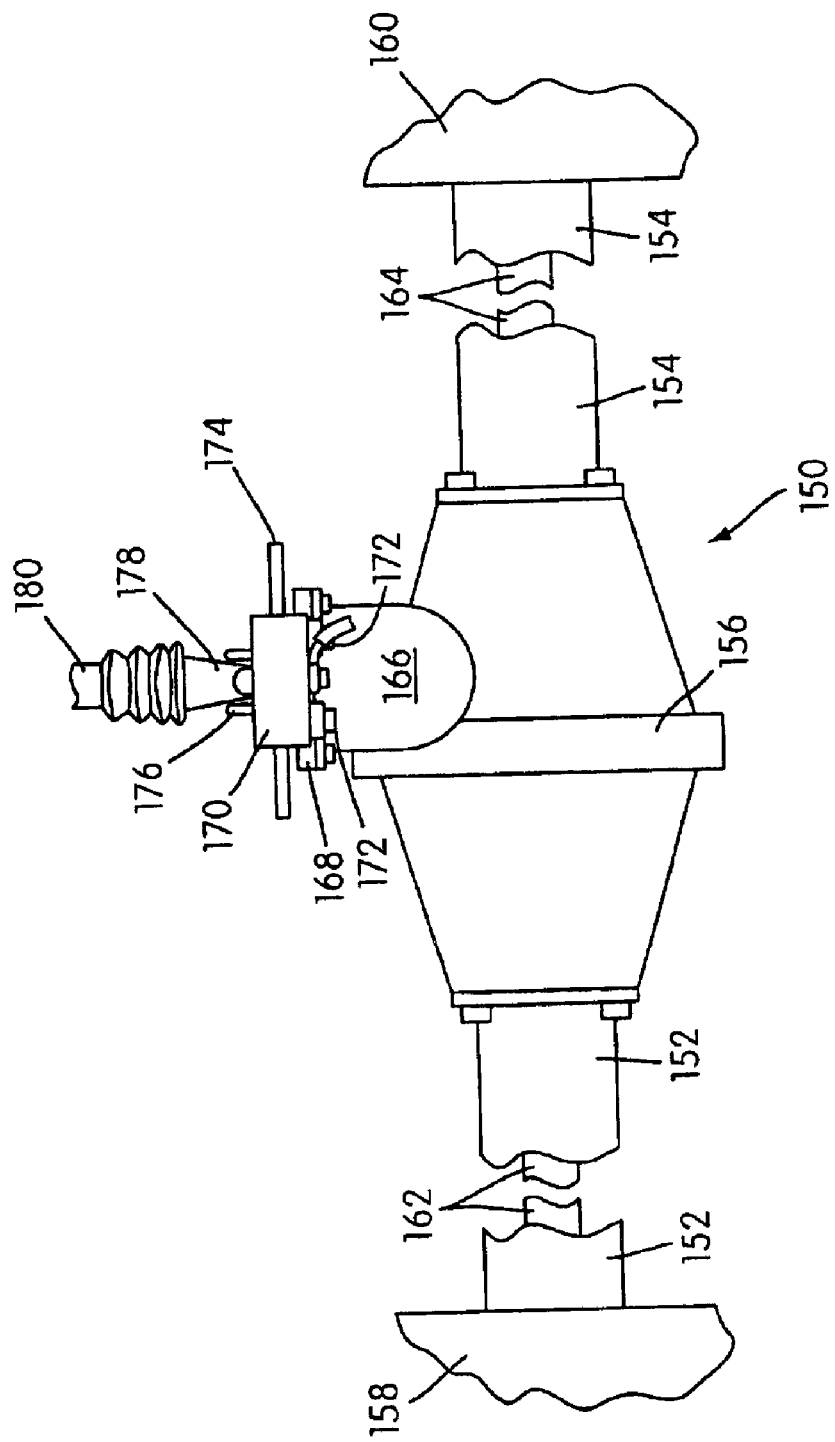
FIG. 11 is a top view of the second embodiment brake system shown in use with a different drive assembly.

For example, FIG. 11 shows a drive assembly 150, which is a substantially rigid single axle type drive assembly. In particular, the drive assembly 150 includes a pair of tubular axle structures 152, 154 that are rigidly connected to opposite ends of an integral gear box 156. The gear box 156 is communicated with wheel assemblies 158, 160 via a respective pair of shaft elements 162, 164. An input portion 166 of the gear box 156 provides a flange structure 168, which is coupled to a caliper 170. It is noted that the flange structure 168 may be integral with the input portion 166 or that the flange structure 168 may be rigidly connected to the input portion 166 via fasteners, as described above with respect to the embodiments 30, 32 of the brake system of the present invention. The caliper 170 is connected to the flange structure 168 with fasteners 172. A brake disk 174 is connected to a yoke 176 of a universal joint 178 on a rearward end of a drive shaft, or propeller shaft, 180.

FIG. 7 shows the drive shaft 112 communicated to the gear box 100 via a universal joint 118. The brake disk 114 is connected to the yoke 116 of the universal joint 118 and, therefore rotates with the drive shaft 112. The driveshaft 112 transfers power between the transmission and the gear box 100, while the universal joint 118 allows the drive shaft 112 to be disposed at an angle relative to the gear box 100 and transmission, as shown in FIG. 2.

Similarly, FIG. 11 shows the brake disk 174 connected to the yoke 176 of the drive shaft 180. In this arrangement, the gear box 156 is moveable relative to the frame 12, e.g., transmission. The universal joint 178 allows for relative movement between the gear box 156 and the transmission.

Alternatively, the drive shaft may be coupled to the gear box via a ball-spline joint, similarly as shown in FIG. 3 with respect to the coupling member 56 and brake disk 52. Similarly as with the universal joints 118, 178, the ball-spline joint allows the drive shaft to transfer power between the transmission and the gear box, while allowing the drive shaft to be angled relative to the gear box and transmission or while allowing the gear box to be moved relative to the frame 12, e.g., transmission.

It is noted that the brake disks 114, 174 are preferably formed of a heat resistant metallic material. It is preferable for the brake pads 300, 302 to be formed of a friction material to increase the breaking force between the brake pads 300, 302 and the brake disk. It is also preferable for the material of the brake pads 300, 302 to be relatively softer than the material of the brake disk. As such, the brake pads 300, 302 may absorb a greater amount of wear than the brake disk and may be replaced at relatively less expense, while protecting the brake disk from extensive damage.

As with the brake system 30 described hereinabove, the disk brake system 32, in the illustrated embodiment, is hydraulically-actuated. It is contemplated that an additional brake-actuating mechanism 360, shown in FIG. 1, may be manipulable by the user to thereby engage the brake caliper. It may be preferable, for the brake-actuating mechanism 360 to include a second lever member 362, similar to the lever member 354, or a pedal member (not shown) actuable by the user's foot. In any case, when actuated by the user, the brake-actuating mechanism 360 delivers a volume of fluid under pressure to the brake caliper, which engages the brake pads 300, 302 with the associated surfaces of the brake disk effectively "squeezing" the brake disk.

As the drive shaft and the wheel assemblies 108 and 110 are rotationally synchronous through the gear box, applying a braking force on the drive shaft via the cooperation of the brake caliper and the brake disk, affects the braking of the wheel assemblies 108 and 110. As such, the user may actuate the brake caliper to slow and/or stop the ATV 10.

The embodiment 32 of the brake system of the present invention is advantageous due to the inboard arrangement thereof. Similarly with the first embodiment 30, the inboard arrangement significantly reduces damage to the brake system 32 caused by rocks, sticks, and other debris while traversing rugged terrain. The disk brake system 32 is especially well protected when a skid plate, or protector plate, (not shown) is fixedly attached to the frame 12 in protecting relation to the disk brake system 32. Furthermore, this embodiment is advantageous in that a significant reduction of overall weight is reduced by utilizing a singular disk and caliper versus a pair of calipers and disks, as previous systems utilized. The weight on the suspension system is also reduced, allowing for less expensive designs.

Additionally, torque acting on the drive shaft (and therefore the brake disk) is relatively lower than the torque on the wheel assemblies 108, 110, due to the gearing ratio of the gear box. Consequently, the brake disk and brake caliper may be of relatively smaller size and effectively slow or stop the ATV 10. The relatively smaller size of the components of the brake system 32 also reduces the overall weight of the ATV and the weight on the suspension system.

It will be appreciated that numerous modifications to and departures from the preferred embodiments described above will occur to those having skill in the art.

What is claimed is:

1. An all-terrain vehicle comprising:
   a. a frame;
   b. at least four wheels supporting the frame, including a rear pair of wheels mounted on a rear wheel axle and a front pair of wheels mounted on an articulated front wheel axle including a first half shaft and a second half shaft, each wheel including a low pressure balloon tire;
   c. a straddle seat mounted on the frame for supporting a rider;
   d. a handlebar disposed on the frame and operatively connected to at least one of the wheels for steering the vehicle;
   e. an engine disposed on the frame and operatively connected to at least one of the wheels to propel the vehicle;
   f. a front drive shaft operatively interconnecting the engine with a front differential, each half shaft of the front wheel axle being operatively connected to the front differential and including a joint proximate the front differential;
   g. a first front brake disk disposed on the joint of the first half shaft and a second front brake disposed on the joint of the second half shaft;
   h. a rear gear case operatively connected to the rear wheel axle;
   i. a rear drive shaft operatively interconnecting the engine with the rear gear case; and
   j. an uncovered rear brake disk associated with the rear drive shaft disposed between the engine and the rear wheel axle.

2. The all-terrain vehicle of claim 1, further comprising a front caliper associated with the front brake disk.

3. The all-terrain vehicle of claim 2, wherein the front caliper is hydraulically actuated.

4. The all-terrain vehicle of claim 2, wherein the front caliper is mechanically actuated.

5. The all-terrain vehicle of claim 2, wherein the front caliper is directly connected to the front differential.

6. The all-terrain vehicle of claim 1, further comprising a rear caliper in cooperation with the rear brake disk.

7. The all-terrain vehicle of claim 6, wherein the rear caliper is hydraulically actuated.

8. The all-terrain vehicle of claim 6, wherein the rear caliper is mechanically actuated.

9. The all-terrain vehicle of claim 1, further comprising a rear caliper associated with the rear brake disk.

10. The all-terrain vehicle of claim 9, wherein the rear caliper is hydraulically actuated.

11. The all-terrain vehicle of claim 9, wherein the rear caliper is mechanically actuated.

12. The all-terrain vehicle of claim 1, wherein the all-terrain vehicle comprises only four wheels.

13. The all-terrain vehicle of claim 1, wherein the frame is disposed between the rear disk brake and the ground so as to provide protection for the rear disk brake.

14. The all-terrain vehicle of claim 1, further including a protector disposed on the frame for protecting the rear disk brake.

15. The all-terrain vehicle of claim 1, wherein the frame protects the rear disk brake.

* * * * *